May 6, 1969      R. E. WALKER      3,443,132

DYNAMOELECTRIC MACHINE WITH LONGITUDINALLY SPLIT HOUSING

Filed April 19, 1966

INVENTOR.
Robert E. Walker

United States Patent Office 3,443,132
Patented May 6, 1969

3,443,132
DYNAMOELECTRIC MACHINE WITH LONGITUDINALLY SPLIT HOUSING
Robert E. Walker, Great Lakes, Ill. (USS Buchanan DDG–14, % FPO, San Francisco, Calif. 96601)
Filed Apr. 19, 1966, Ser. No. 543,632
Int. Cl. H02k 15/14
U.S. Cl. 310—42  2 Claims

ABSTRACT OF THE DISCLOSURE

A dynamoelectric machine in which the housing is formed of cast, identical, longitudinally extending halves, each half having a recess, which recesses complement one another to form an opening through which wires can extend. The stator yoke to receive the stator core is integral with the housing halves, and additional recesses at either side of the yoke provides support for the stator winding end turns.

---

This invention relates to housing and supporting devices for electrical equipment, and more particularly a dynamoelectric machine.

It is therefore the main purpose of this invention to provide a dynamoelectric machine wherein the stator yoke portion is of integral construction with the securing sections of the casing.

Another object of this invention is to provide a dynamoelectric machine which includes a pair of semi-cylindrical halves for proper alignment of the core, stator windings and the shaft of said machine.

Another object of this invention is to provide a dynamoelectric machine which is provided with a core for mounting the windings of the integrally constructed stator.

Still another object of this invention is to provide a dynamoelectric machine which is of rugged construction, is inexpensive to manufacture, includes a pair of identical housing halves having a low reluctance path for the field flux.

Other objects and advantages of this invention will become apparent from a consideration of the following detailed description taken in connection with the accompanying drawing, wherein a satisfactory embodiment of the invention is shown.

Figures 1, 2:
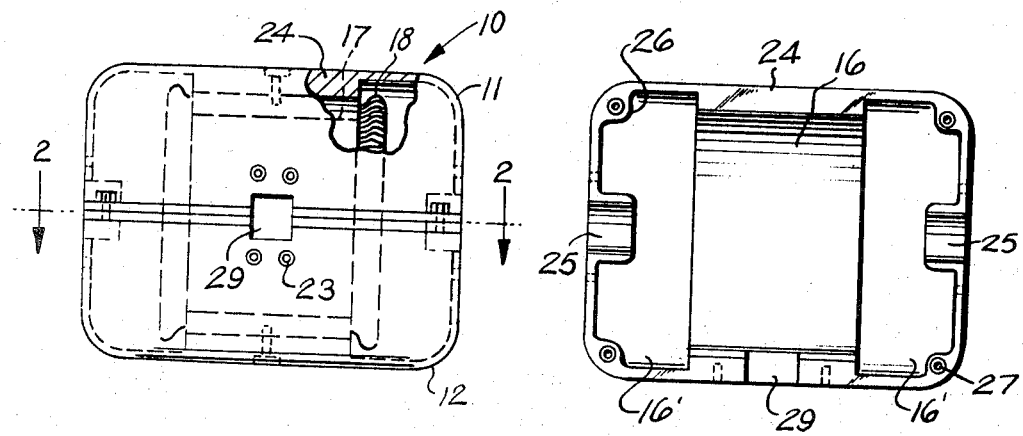
FIGURE 1 is a side view of this invention shown in elevation and partly broken away.
FIGURE 2 is a cross-sectional view taken along the lines 2—2 of FIGURE 1 with the core shown removed therefrom.
Figure 3:
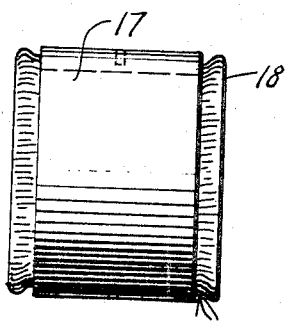
FIGURE 3 is a side elevational view of the core shown removed from FIGURE 1.

According to this invention, a dynamoelectric machine 10 is provided with a pair of cast, matching, semi-cylindrical halves 11 and 12 which are provided with corresponding projections 13 and 14 adapted to receive locking screws 15 therein. The interior of each half 11 or 12 is provided with a concave recess 16 for housing and supporting core 17 therein. At the end of said recess 16 of each half provisions are made for the auxiliary recesses 16' adapted to house and support the outwardly extending end turns of windings 18 of core 17. In addition to the windings 18 recesses 16' support the field coils, brush holders and wires extending from said coils (not shown). Wall sections of each half include a stator yoke portion 24 integrally secured within the bell or supporting sections 26 which are provided with a plurality of holes 27 for admitting screws 15 therein. The end portions of each half are provided with inwardly extending half hub portions 25 which complement one another for supporting the shaft (not shown) of the dynamoelectric machine. Each of the halves is provided with a like recess and complement one another to form an opening 29 which, in cooperation with holes 23 provides outlet means for electrical leads extending outwardly from the windings 18, field coils and the brushes.

Figure 4:
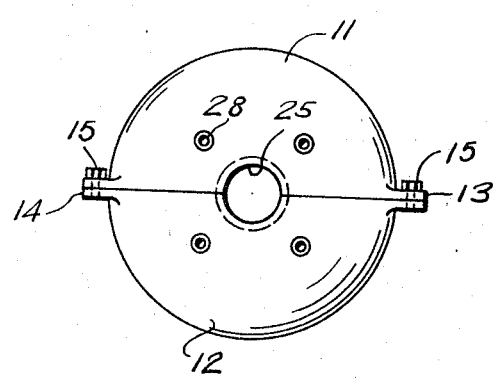
FIGURE 4 is an end view of FIGURE 1.

It will also be noted that, as shown in FIGURE 4, a plurality of holes 28 are provided for securing said machine 10 to another object (not shown).

What I now claim is:

1. A dynamoelectric machine comprising, in combination, a pair of identical and cast semi-cylindrical halves, the central portion of said each half being provided with a concave recess for admitting a core therein, an auxiliary recess of a greater diameter than said recess being provided on both ends of said recesses, the wall section adjacent said core including the stator portion of said structure, stator windings adapted to be secured to said portion, said stator portion being integrally cast with the corner portions of said half and each end portion of each half being provided with an inwardly extending half hub portion providing a semi-cylindrical opening for aligning each half to each other and for admitting the shaft of the machine.

2. The combination according to claim 1, wherein each of said stator portions is provided with a recess, which recesses complement one another to form an opening for receiving the electric leads therein.

References Cited

UNITED STATES PATENTS

| 1,646,962 | 10/1927 | Hillix | 310—258 X |
| 2,643,351 | 6/1953 | Feiertag | 310—258 |
| 2,752,514 | 6/1956 | Schwenden | 310—258 X |
| 2,796,835 | 6/1957 | White | 310—86 X |
| 3,238,401 | 3/1966 | Baclawski | 310—91 |

FOREIGN PATENTS 696,878  10/1940  Germany.

WARREN E. RAY, Primary Examiner.

U.S. Cl. X.R.
310—259, 260